Oct. 31, 1961 H. FELLOWS ET AL 3,006,547

FREQUENCY DIVIDING CIRCUITS

Filed Feb. 27, 1957 2 Sheets-Sheet 1

INVENTORS:
HORACE FELLOWS
REGINALD EDWARD ALBERT HEAD
BY
Richardson, David and Nordon
ATTYS.

INVENTORS:
HORACE FELLOWS
REGINALD EDWARD ALBERT HEAD
By Richardson, David and Nordon
ATTYS.

3,006,547
FREQUENCY DIVIDING CIRCUITS

Horace Fellows and Reginald Edward Albert Head, Wolverhampton, England, assignors to Jean Faure-Herman, Boulogne-sur-Seine, France Filed Feb. 27, 1957, Ser. No. 642,789
7 Claims. (Cl. 235—151)

This invention relates to an apparatus for continuously adjusting the effective division factor of a chain of electronic frequency dividers.

While of general application, and of utility in electronic computers, the invention is primarily intended for application to a liquid flowmeter, comprising an electrical transmitter for emitting pulses at a frequency determined by the rate of flow of liquid to be measured, a counter, and a chain of electronic frequency dividers interposed between the transmitter and the counter. Such a flowmeter normally indicates volumetric flow only, but the invention converts the flowmeter into one numerically indicating mass flow for a particular liquid of known specific gravity. It also provides a continuous indication of mass flow rate on a separate ratemeter forming part of the flowmeter.

The invention provides, in combination with a chain of electronic frequency dividers, a constant frequency oscillator of manually adjustable mark-space ratio, and an electronic gate for controlling the transmission to the dividing chain of pulses to be divided, the gate permitting of transmission of the pulses during alternate half cycles of the oscillator only.

Preferably, the dividers are binary dividers and, in the case of application to the above-described flowmeter, the circuit varies electronically the division factor of the binary chain between $2^n \pm 15\%$ so that the division factor (N) is equal to the number of impulses produced by the transmitter (S) per unit mass of fuel.

This is achieved by blocking a predetermined percentage of the output pulses from the transmitter and permitting the remainder to receive binary chain division with subsequent indication on a ratemeter and/or on a counter.

$$N = S\left(\frac{t_2}{t_1+t_2}\right)2^n$$

where $2^n$=normal binary chain division.

$t_2$=interval during each oscillator cycle throughout which the binary is operative.

$t_1$=interval during each oscillator cycle throughout which the binary is inoperative.

The "mark-space" ratio of the constant frequency oscillator is referred to hereinafter and may be defined as the ratio of $t_1$ to $t_2$ as used in the equation given above.

The output from the constant frequency, variable mark-space ratio ($t_2/t_1$) oscillator is applied to a cathode follower stage which clips the negative going half-cycles prior to application thereof to the cathode of the electronic gate. Signals from the transmitter are applied, after amplification, shaping and differentiation to the control grid of this gate. The signals applied to the cathode of the gate switch this stage in and out of operation during time intervals $t_2$ and $t_1$ respectively.

The device has been so designed that only during the operative periods $t_2$ will shaper pulses appear at the gate-anode for consequent binary-chain division. A larger value for the mark-space ratio $t_2/t_1$ will permit a larger percentage of transmitter pulses to pass down the binary-chain with a resultant reduction in the effective average overall division ratio of the binary dividing chain.

One specific embodiment of fuel flowmeter according to the present invention will now be described in more detail, by way of example, with reference to the accompanying drawings, in which.

Figures 2, 3:
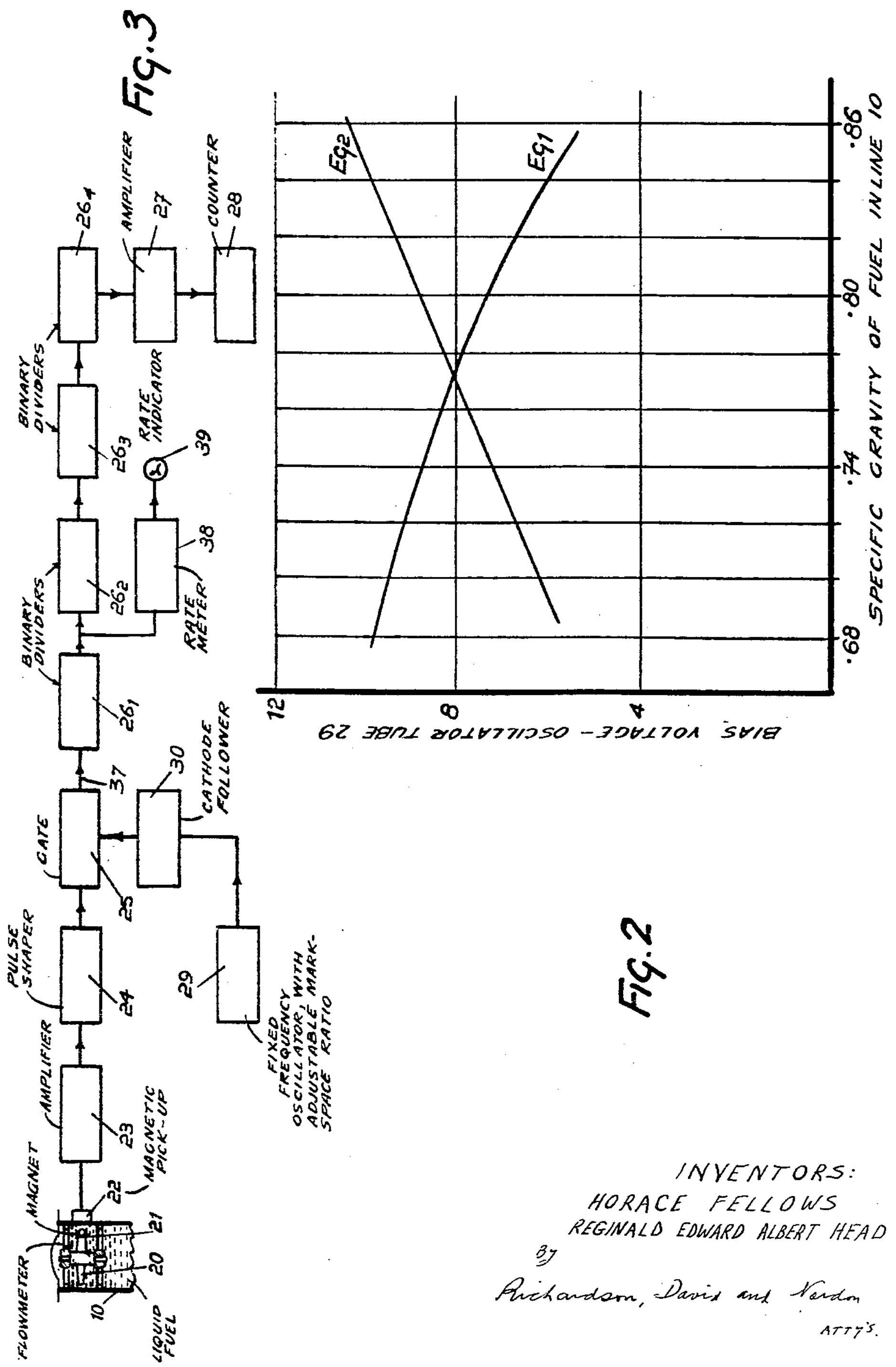
FIG. 2 is a graph.
FIG. 3 is a block diagram of the flowmeter.

As shown in FIG. 3, the flowmeter comprises a vaned rotor 20 mounted within the pipe 10 through which fuel is flowing. The rotor 20 is arranged for rotation about the longitudinal axis of the pipe. The rotor 20 carries a magnet 21 in one of its blades and serves, when rotated by the flow of fuel through the pipe, to generate in a magnetic pickup 22 external to the pipe, a series of electrical pulses at a rate proportional to the volumetric rate of flow of fuel through the pipe. The pulses are passed via an amplifier 23, a shaper 24, an electronic gate 25, and four cascaded binary electronic frequency dividers $26_1$ to $26_4$ to an amplifier 27 which operates an electromechanical counter 28. As so far described, the counter would give a volumetric indication of flow, but corrections for changes in density of the fuel are applied, thereby causing the counter 28 to give an indication of total flow in units of mass instead of units of volume, by means of a local oscillator 29 and a cathode follower 30 as will now be described with reference to FIG. 1.

The shaper 24 is constituted by a monostable flip-flop circuit the pulses from the amplifier being applied to the grid 31 of the normally non-conducting section thereof and pulses being passed on to the grid 32 of the electronic gate from the anode 33 of the normally conducting section of the shaper 24. Certain of the pulses are, however, suppressed by the electronic gate, as will now be described.

Figure 1:
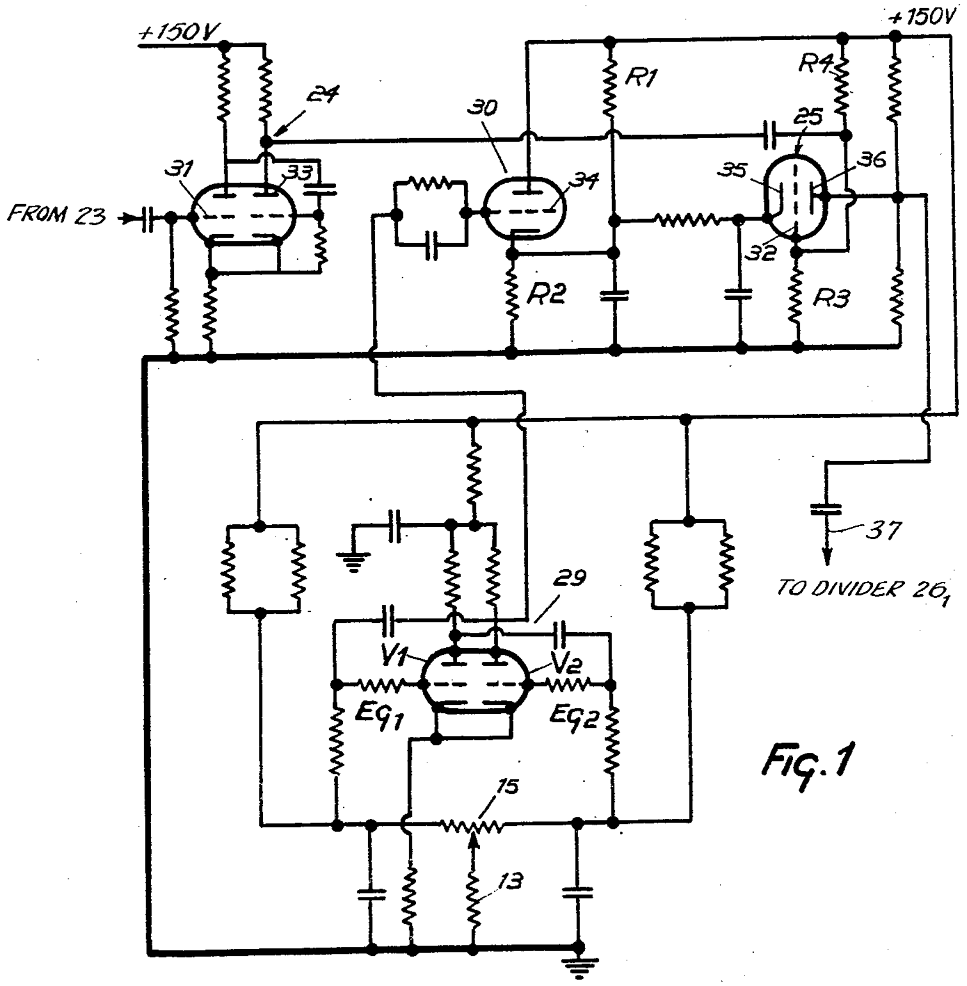
FIG. 1 is a circuit diagram of the variable-division factor circuit.

The local oscillator 29 is a conventional multivibrator which applies a signal of variable mark-space to the grid 34 of the cathode follower 30. The mark-space ratio of the signals is varied by a potentiometer constituted by a resistor 15 and an associated slider 13. The slider 13 is manually adjustable to suit variations in density of the fuel and, as shown in FIGS. 1 and 2, effects corresponding changes in the voltages EG1 and EG2 applied respectively to the grids of twin triode sections $V_1$ and $V_2$ of the oscillator tube 29. The adjustment is such that the mark-space ratio $t_2/t_1$ is decreased in response to an increase in density of the fuel and vice versa. As an alternative, however, the position of the slider 13 may be varied automatically in accordance with changes in the density of the fuel.

The clipped wave form from the cathode follower 30 is applied after filtering, as switching bias to the cathode 35 of the electronic gate 25. During the "mark" intervals $t_2$, the cathode follower 30 is cut-off and therefore the common cathode voltage, at its cathode end and at that of the gate triode 25 will be determined by:

$$\frac{R2}{R1+R2}$$

of the anode supply voltage.

The standing gate grid voltage on grid 32 is:

$$\frac{R3}{R3+R4}$$

of the anode supply voltage.

The gate-grid-bias during $t_2$ is therefore:

$$\frac{R2}{R1+R2}-\frac{R3}{R3+R4}$$

of the indicated 150 volt anode supply voltage and is chosen to be approximately 11 volts beyond cut-off for the gate tube 25.

With no shaper signals applied to the gate grid 32 during the "mark" interval $t_2$ the gate triode 25 will not conduct nor will it conduct during the "space" interval $t_1$, since the gate grid 32 will swing to −11 volts beyond cut-off during this time.

When the shaper output (approx. 20 v. positive peak) is applied to the gate grid 32 and when this coincides with $t_2$ the peaks of the grid signals take the valve 25 into the conducting region and pulses appear at its anode 36 and are transmitted by the line 37 to the first binary divider $26_1$ (FIG. 3).

During $t_1$, however, the 20 v. positive peak signal applied to the grid 32 is insufficient to cause the valve 25 to conduct and signals during this semi-period are blanked.

The proportion of the pulses passed to the counter 28 thus depends on the mark-space ratio of the oscillator 29 as determined by the adjustment imparted to the potentiometer 13, 15. The counter 28 is thus caused to give an indication of mass flow instead of volumetric flow.

The ratemater 38, with associated indicator 39, is connected to the output of the first divider $26_1$. This will indicate the rate of mass flow of fuel. The ratemeter comprises a monostable flip-flop, the pulses from the divider $26_1$ being applied to the grid of its normally non-conducting section and the indicator 39 being included in the anode circuit of said normally non-conducting section.

What we claim is:

1. In a pulse responsive dividing apparatus, an input circuit for receiving a series of pulses, a divider connected to receive pulses from said input circuit, a gate interposed between said divider and said input circuit, said gate being controllable for selectively passing or preventing the passage of pulses therethrough, an oscillator connected to said gate for controlling the passage of pulses therethrough, said oscillator being an oscillator of fixed frequency which generates pulses, ratio adjusting means connected to said oscillator for varying the mark-space ratio of said oscillator pulses, and an output circuit connected to said divider to receive a divided number of pulses therefrom, the effective division ratio of said divider with respect to pulses passing from said input circuit to said output circuit being variable by said ratio adjusting means.

2. Apparatus according to claim 1, further comprising a shaper included in said input circuit, said shaper causing pulses of predetermined amplitude and substantially rectangular wave shape to be applied to said gate from said input circuit.

3. Apparatus according to claim 2, wherein said shaper is a flip-flop circuit having a single condition of stability.

4. In a pulse responsive dividing apparatus, an input circuit for receiving a series of pulses, a divider connected to receive pulses from said input circuit, a gate interposed between said divider and said input circuit, said gate being controllable for selectively permitting or preventing the passage of pulses from said input circuit to said divider, a pulse generating multivibrator of constant frequency, said multivibrator comprising a pair of biased control electrodes, ratio adjusting means for varying the relative biases on said control electrodes to vary the mark-space ratio of the pulses generated by said multivibrator, and an output circuit connected to receive pulses after division by said divider, said ratio adjustment means permitting variation of the effective division ratio of said divider with respect to pulses passing from said input circuit to said output circuit.

5. In a pulse responsive dividing apparatus, an input circuit for receiving a series of pulses, pulse shaping means included in said input circuit, a gate circuit comprising a tube having an anode, a cathode and a control grid, said grid being connected to receive pulses from said shaping circuit, a divider connected to receive pulses from said anode, an output circuit connected to receive pulses after division by said divider, a cathode follower stage having its output connected to said cathode, a multivibrator of constant frequency connected to drive said cathode follower stage, said multivibrator delivering a series of uniformly spaced pulses thereto, and ratio adjustment means connected to said multivibrator to vary the mark-space ratio of the pulses delivered to said cathode follower stage, the effective division ratio of said divider with respect to pulses passing from said input circuit to said output circuit being variable by said ratio adjustment means.

6. Apparatus according to claim 5, further comprising a low-pass filter interposed between the output of said cathode follower stage and the cathode of said gate circuit tube.

7. A flowmeter comprising, a flow-responsive element, pulse producing means actuated by said element for producing a series of pulses having a repetition rate which varies in accordance with the flow velocity to be measured, a divider connected to receive pulses from said pulse producing means, a gate circuit interposed between said pulse producing means and said divider, said gate circuit being controllable for selectively blocking and unblocking the passage of pulses from said pulse producing means to said divider, an oscillator connected to said gate for controlling the blocking operation thereof, said oscillator being an oscillator of fixed frequency which generates pulses at a uniform repetition rate, ratio adjusting means connected to said oscillator for varying the mark-space ratio of said oscillator pulses, and measuring means connected to receive pulses from said divider after division thereby, said ratio adjusting means permitting adjustment of the effective division rate of said divider with respect to pulses produced by said pulse producing means and delivered to said measuring means.

References Cited in the file of this patent

UNITED STATES PATENTS

| | | |
|---|---|---|
| 2,496,912 | Grosdoff | Feb. 7, 1950 |
| 2,623,389 | Oosterom | Dec. 30, 1952 |
| 2,677,104 | Chase | Apr. 27, 1954 |
| 2,754,056 | Friedman | July 10, 1956 |
| 2,767,582 | Bertelink | Oct. 23, 1956 |
| 2,769,595 | Bogley | Nov. 6, 1956 |
| 2,806,205 | Donath | Sept. 10, 1957 |
| 2,864,556 | Raymond | Dec. 16, 1958 |